Dec. 16, 1958 V. F. GONGOLL 2,864,088
EYE SHIELD
Filed July 5, 1957 2 Sheets-Sheet 1

INVENTOR.
Vernon F. Gongoll.
BY
William J. Ruano
ATTORNEY.

Dec. 16, 1958  V. F. GONGOLL  2,864,088
EYE SHIELD

Filed July 5, 1957  2 Sheets-Sheet 2

INVENTOR.
Vernon F. Gongoll.
BY
ATTORNEY.

United States Patent Office
2,864,088
Patented Dec. 16, 1958

2,864,088
EYE SHIELD

Vernon F. Gongoll, Shillington, Pa., assignor, by mesne assignments, to The Electric Storage Battery Company, Philadelphia, Pa., a corporation of New Jersey Application July 5, 1957, Serial No. 670,190

4 Claims. (Cl. 2—14)

This invention relates to improvements in eye protective devices and, more particularly, to eye shields or goggles of light weight, soft plastic material.

A common and widely used type of eye shield is that embodying a frame or rim member of plastic material and a one-piece lens which is detachably fastened thereto.

An outstanding disadvantage of this type of construction is the difficulty involved in attaching or detaching the lens with respect to the frame. Numerous modifications have been proposed in the past in attempts to facilitate attachment of the lens to the frame, such as tongue and groove connections around the entire perimeter of the lens and hooks on the nose surrounding portions of the lens which are adapted to engage slots in the ends of the rim. However, these have not truly solved the problem since difficulty is still involved in locking the parts together or unlocking them.

An object of my invention is to provide a novel eye shield which is devoid of the above named disadvantages and which provides an easy and quick means for attachment or detachment of the one-piece lens from the frame.

Another object of the invention is to provide a simple and inexpensive eye shield or goggle which is made entirely of flexible plastic material, therefore which is light in weight and resists corrosive atmospheres, also which is capable of withstanding shocks and impacts and which will effectively protect the eyes and adjoining face portions of the wearer against dust, flying particles and the like encountered in industrial occupations and which may be worn over glasses.

A more specific object of my invention is to provide a separate, detachable nose piece which serves as an intermediate connecting member between the lens and frame to facilitate connection or disconnection thereof.

Other objects and advantages of my invention will become apparent from a study of the following description taken with the accompanying drawings wherein:

Figure 4 is a fragmentary, cross-sectional view taken along line IV—IV of Fig. 1.

Figure 5 is a cross-sectional view taken along line V—V of Fig. 1.

Figure 6 is a cross-sectional view taken along line VI—VI of Fig. 1.

Figure 1:
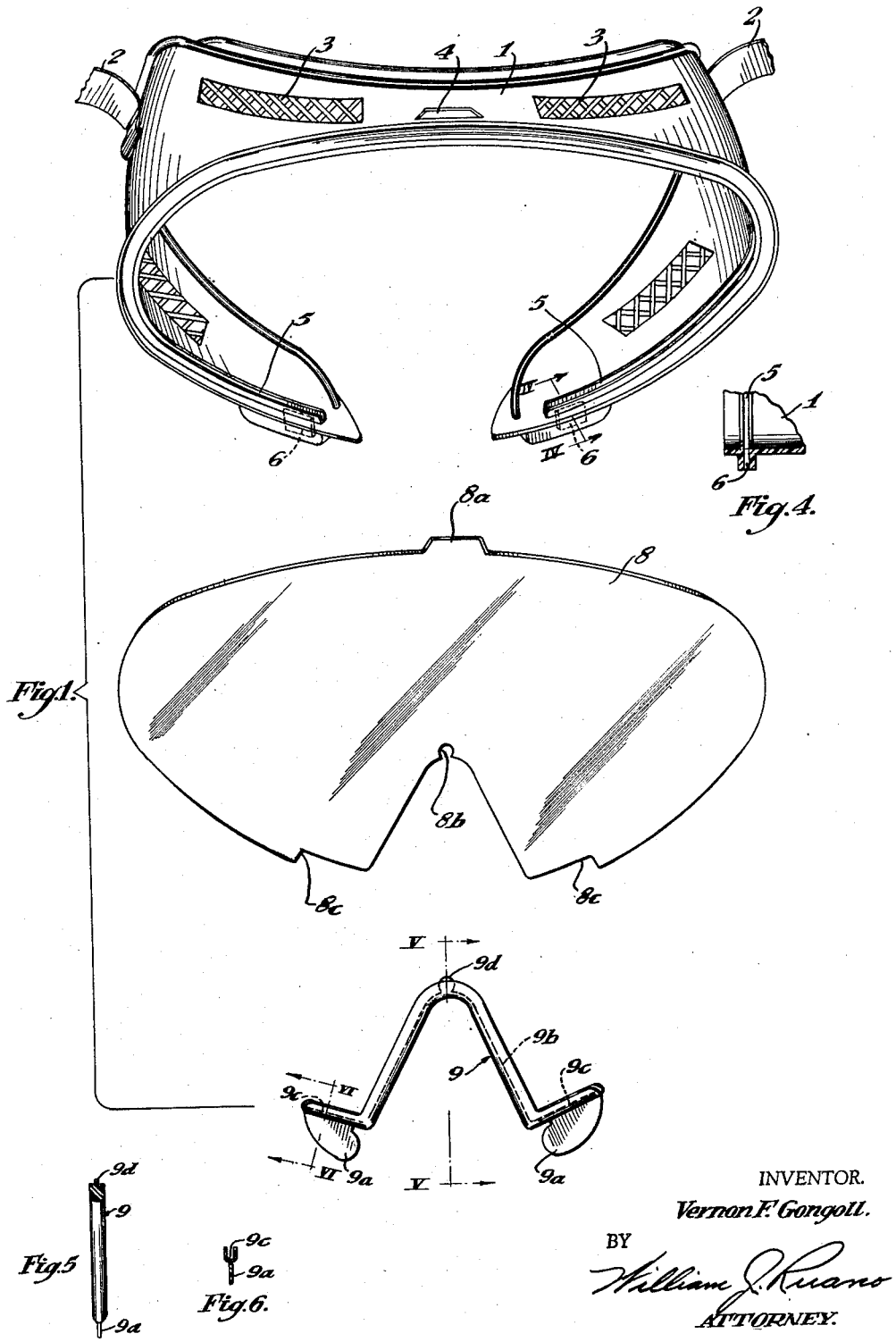
Figure 1 is an exploded view of an eye shield embodying the features of my invention and showing the different parts in disassembled relationship including the frame or rim, shown in perspective, and the single or one-piece lens and the nose piece, shown in plan.
Figure 2:
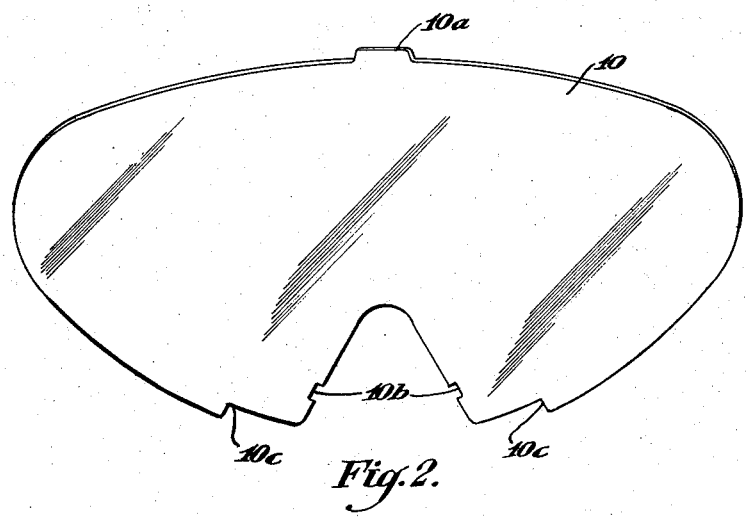
Figure 2 is a front or plan view of a modification of the lens showing a different slot arrangement.
Figure 3:
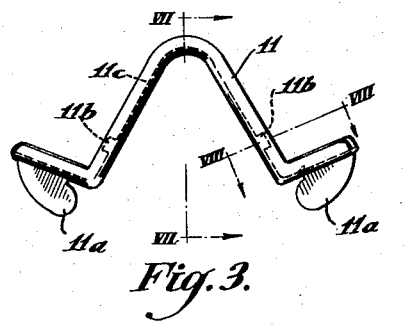
Figure 3 is a front view of a modified form of nose piece which is attachable to the lens shown in Fig. 2.
Figure 7:
Figure 7 is a cross-sectional view taken along line VII—VII of Fig. 3.
Figure 8:
Figure 8 is a cross-sectional view taken along line VIII—VIII of Fig. 3.

Referring more particularly to the drawings, Fig. 1 shows three pieces or elements which form the eye shield embodying the present invention, namely the frame or rim 1, the one-piece transparent plastic lens 8 and the nose piece 9. These elements are shown separately in order to more clearly illustrate their construction.

The frame or rim 1, which is held against the wearer's face by headband straps 2, is comprised of soft, light, flexible plastic such as "polythene" which is highly pliable so as to form a comfortable fit with the contour of the eye-surrounding portions of the wearer's face and which preferably has a plurality of ventilating openings or grids 3 of woven plastic. An integral flange 4 is provided at the top of the frame 1 which has a central groove in its lower portion. Plastic flanges 5 are integrally molded to the inside surface of frame 1 and extend in parallel relationship throughout substantially the entire perimeter of the frame. Slots 6 are provided through integral, depending portions of the frame which extend through the base of the groove formed by the flanges 5, as shown more clearly in Fig. 4.

The single lens 8 is provided on its upper edge with a tongue 8a which is adapted to extend through the above mentioned slotted portion of flange 4. Instead of providing a flange with an inner groove, a slot, only, may be formed in the top portion of the frame 1 through which tongue 8a may be inserted.

On top of the nose-surrounding, cut-out portion of lens 8 is notched out a hole 8b which is slightly greater than a semi-circle in circumference. Also cut-out portions or notches 8c are formed in the lower portion of the lens.

An important and outstanding feature of the present invention is the provision of a separate nose piece, as shown in the lower portion of Fig. 1, which is adapted to fit and engage the bottom cut-out portion of lens 8. Nose piece 9 is preferably made of soft plastic material and is provided, throughout its length, with a central channel or groove 9b, 9c for receiving the peripheral edge of the lens adjoining the cut-out portions 8c and the nose surrounding cut-out portion. A central, integrally molded projection 9d is provided at the top of the nose piece which has greater than a semicircular outline, corresponding to that of notch 8b, and which is adapted to form a snap fit.

The normal, relaxed position of nose piece 9 may be such that the sides thereof are at a greater angle than the sides of the nose-surrounding, notched out portions in lens 8 so as to provide springiness tending to keep the nose piece in engagement with the lens. The arms of nose piece 9 are therefore first squeezed together before insertion in the lens. At the bottom of nose piece 9 are provided integral lugs or hooks 9a, extending centrally and downwardly thereof, which are adapted to project through the slots 6 formed in the frame.

In operation, nose piece 9 is attached to the nose surrounding, cut-out portion of lens 8 and held thereto by the snap fit between projection 9d and notch 8b, also by the natural springiness of the arms of the nose piece 9, tending to hold the notched out channels 9b against the edges of the cut-out portions of the nose piece. Thereafter, hooks or ears 9a are inserted through the slots 6 so as to anchor the nose piece and lens to the frame and the perimeter of lens 8 is inserted in the groove or channel formed by flanges 5 until the entire rim is fastened thereto.

When it is desired to detach the lens for replacement, the nose piece 9 is grasped and pulled downwardly so as to break the snap connection between projection 9d and slot 8b. Then lens 8 may be easily pulled away from the groove formed by flanges 5 in which its perimeter was seated. Finally, the nose piece 9 may be easily removed from the frame by withdrawing the ears 9a from the slots 6.

Figs. 2, 3, 7 and 8 show a modified construction of the lens and nose piece including a lens 10 having an upper tongue 10a and lower slots 10c which correspond to lens 8, its upper tongue 8a and lower slots 8c, respectively. However, instead of providing a top notch, such as 8b in Fig. 1, two separate notches 10 are provided along the sides of the nose-surrounding, cut-out portion. The corresponding nose piece 11 is provided with a central groove or slot 11c and with integral projections 11b emerging from the central portion of said slot, which projections are adapted to fit snugly in notches 10b. The manner of attachment and detachment of the nose piece and lens 10 are the same as described in connection with the nose piece and lens shown in Fig. 1.

The nose piece described above is not confined to use in a single lens shield but may be used on any ophthalmic mounting which includes a nose piece or pad.

Thus it will be seen that I have provided an efficient, light weight, eye shield having an easily and quickly detachable and attachable connection between the lens and frame and which involves the provision of a readily detachable nose piece serving as an intermediate element for facilitating attachment or detachment of the lens and frame; furthermore I have provided a simple and relatively inexpensive eye shield comprising a minimum number of simple and inexpensive parts, which enable the eye shield to be produced at very low cost.

While I have illustrated and described several specific embodiments of my invention, it will be understood that they are by way of illustration only, and that various changes and modifications may be made within the contemplation of my invention and within the scope of the following claims.

I claim:

1. An eye shield comprising a thin, flexible rim member of substantial width having an inner edge adapted to fit the eye-surrounding portions of the wearer's face exclusive of the nose portion and having an outer edge with a substantially continuous channel in the inner surface thereof, a slot formed in both end portions of said channel, a one-piece lens of flexible transparent material detachably engageable at its periphery with said channel with the exception of the nose-surrounding portion thereof, and a flexible nose piece having a top central groove into which is detachably fitted said nose-surrounding portion of the lens and having depending hooks extending from the bottom extremities thereof which are adapted to fit through said slots formed in the end portions of said channel of the rim member, said groove and said nose-surrounding portion of the lens being provided with means for detachably locking said nose piece to said lens.

2. An eye shield, as recited in claim 1, wherein said detachable locking means comprises an upstanding projection integrally formed in the central, nose-bridging portion of said nose piece groove, and a notch formed in the center of the nose-surrounding, peripheral portion of said lens, said projection and notch being of greater than semi-circular outline.

3. An eye shield as recited in claim 1, wherein said detachable locking means comprises a plurality of notches and correspondingly shaped projections formed in the nose-surrounding peripheral portion of said lens and in said nose piece groove.

4. An eye shield comprising a thin, flexible rim member of substantial width having an inner edge adapted to fit the eye-surrounding portions of the wearer's face exclusive of the nose portion and having an outer edge with a substantially continuous channel in the inner surface thereof, a slot formed in both end portions of said channel, a one-piece lens of flexible transparent material detachably engageable at its periphery with said channel with the exception of the nose-surrounding portion thereof, and a flexible nose piece having a top central groove into which is detachably fitted said nose-surrounding portion of the lens and having laterally outwardly extending arms provided with upper grooves and with integral depending hook portions which are adapted to fit through said slots formed in the end portions of said channel of the rim member, said rim member, lens and nose-piece being made of pliable, plastic material, the nose-surrounding portion of the lens being provided with a notch of greater than semi-circular outline and the nose-bridging portion of said nose piece groove having an upstanding integral projection of corresponding outline adapted to provide a snap fit with said notch, a pair of notches formed along the periphery of said lens beginning from the ends of said nose-surrounding portion providing shoulders and end stops for said arms, the peripheral portions of said last named notches adapted to detachably fit said upper grooves of said arms.

References Cited in the file of this patent

UNITED STATES PATENTS

| | | |
|---|---|---|
| 2,388,635 | Ditto | Nov. 6, 1945 |
| 2,422,534 | DuBois | June 17, 1947 |
| 2,444,498 | Cochran | July 6, 1948 |
| 2,706,815 | Parmelee | Apr. 26, 1955 |